United States Patent [19]

Kuehn et al.

[11] Patent Number: 5,499,527
[45] Date of Patent: Mar. 19, 1996

[54] METHOD AND APPARATUS FOR TESTING A SPRING-LOADED SAFETY VALVE

[75] Inventors: Edmund Kuehn, Erlangen; Tilo Sieber, Bannewitz; Werner Butkereit, Weisendorf, all of Germany

[73] Assignee: Siemens Aktiengesellschaft, Germany

[21] Appl. No.: 239,725

[22] Filed: May 9, 1994

[30] Foreign Application Priority Data

May 7, 1993 [DE] Germany .......................... 43 15 281.3

[51] Int. Cl.⁶ .......................... G01L 27/00; G01M 19/00; F16K 37/00
[52] U.S. Cl. .......................... 73/4 R
[58] Field of Search .................. 73/4 R, 865.9, 73/168

[56] References Cited

U.S. PATENT DOCUMENTS

| | | | |
|---|---|---|---|
| 3,768,299 | 10/1973 | Garren | 73/4 R |
| 3,872,875 | 3/1975 | Raidl, Jr. | 73/4 R X |
| 4,274,438 | 6/1981 | La Coste | 137/551 |
| 4,548,067 | 10/1985 | Cox | 73/4 R |
| 4,572,237 | 2/1986 | Thompson | 137/487.5 |
| 4,646,556 | 3/1987 | Courcoux et al. | 73/4 R |
| 4,761,999 | 8/1988 | Thompson | 73/168 |
| 4,852,387 | 8/1989 | Bingham | 73/4 R |
| 4,893,494 | 1/1990 | Hart | 73/4 R |
| 4,949,288 | 8/1990 | Bookout | 364/558 |
| 5,174,321 | 12/1992 | Danzy | 137/14 |
| 5,257,208 | 10/1993 | Brown et al. | 73/4 R X |
| 5,357,800 | 10/1994 | Reuter et al. | 73/121 |
| 5,365,769 | 11/1994 | Ferry | 73/4 R |

FOREIGN PATENT DOCUMENTS

| | | |
|---|---|---|
| 0017365 | 10/1980 | European Pat. Off. . |
| 3703535 | 8/1988 | Germany . |
| 3737095 | 5/1989 | Germany . |

OTHER PUBLICATIONS

"Einbau und Prüfung . . . ", VGB Kraftwerkstechnik 73, 1993, vol., 1, pp. 54–59.

*Primary Examiner*—Thomas P. Noland
*Attorney, Agent, or Firm*—Herbert L. Lerner; Laurence A. Greenberg

[57] ABSTRACT

A method for testing a spring-loaded safety valve includes ascertaining a closing pressure of the safety valve by selecting a pressure of a medium acting on a closing device of the safety valve to be less than an expected closing pressure. The closing device is lifted with a force originating at an auxiliary lifting device by acting upon a chamber below a lifting bell in the lifting device with an auxiliary medium. Then the safety valve is closed by diverting the auxiliary medium out of the chamber and simultaneously a supply of auxiliary medium is passed through the chamber and diverted. Pressures of the medium and of the auxiliary medium are measured as the safety valve is closing. The closing pressure is determined from the measured pressures, from an effective area ratio of the lifting bell and a valve plate of the closing device, and from a constant, in accordance with the equation:

$$P_S = P_P + (P_H \cdot V_A)/(m+1),$$

wherein $P_S$ is the closing pressure of the safety valve, $P_P$ is the measured pressure of the medium acting upon the closing device in the closing process, $P_H$ is the measured pressure of the auxiliary medium acting upon the lifting bell in the closing process, $V_A$ is the ratio of the effective area of the lifting bell and the closing device, and m is a constant. An apparatus for testing the safety valve is also provided.

2 Claims, 1 Drawing Sheet

METHOD AND APPARATUS FOR TESTING A SPRING-LOADED SAFETY VALVE

BACKGROUND OF THE INVENTION

1. Field of the Invention

The invention relates to a method for testing a spring-loaded safety valve that includes a closing device and is acted upon by a medium. The invention also relates to an apparatus for testing such a spring-loaded safety valve.

The closing device of the spring-loaded safety valve has a spindle onto which a valve plate is formed. The valve plate may rest on a valve seat, which is a component of a valve housing. In that situation, the safety valve is closed. In other words, a connection between an incoming and an outgoing line for the medium is closed.

Such spring-loaded safety valves are used, for instance, to control a main valve but are also used in a self-shielding fashion. For instance, such a safety valve may communicate on the inlet side with the primary loop of a nuclear power plant. If the pressure on the inlet side exceeds a response pressure of the safety valve, the closing device of the safety valve is open counter to a spring force. The medium can then pass through the safety valve to reach a main valve and open it. It is not until the pressure of the medium in the safety valve has dropped below a closing pressure of the safety valve that the spring force is overcome again and the safety valve is closed.

The response pressure of a spring-loaded safety valve is always above the closing pressure. The valve opens if the higher response pressure is exceeded and does not close again until the pressure again drops below the lower closing pressure.

In the course of recurring safety checks, particularly in a nuclear power plant, the mode of operation of the spring-loaded safety valves, for instance of the control valves, must also checked. It is known to perform such a test at a pressure of the medium that is above the closing pressure of the safety valve. It is then possible to determine the instantaneous closing pressure of the safety valve, as is required in a comprehensive safety check. In that kind of known test, the pressure of the medium is reduced after the opening of the safety valve, by cooling the medium, until such time as the safety valve closes. For example, the cooling may be performed by spraying with cold water. However, that leads to a high thermal strain on the components of the valve and other components located in the loop of the medium.

Due to that high thermal strain, testing of the safety valves was previously frequently performed at a pressure of the medium which was below the closing pressure. In that case, an auxiliary lifting device was needed to enable opening of the safety valve. Such an auxiliary lifting device is also necessary if a test is done with a pressure of the medium that is between the closing pressure and the response pressure.

A typical auxiliary lifting device is an appliance that can be mounted on the safety valve. On one hand the housing of the auxiliary lifting device is joined to the valve housing, and on the other hand a lifting bell in the auxiliary lifting device is joined to the spindle of the safety valve. Such a lifting bell may also be constructed to be flat, in the form of a lifting plate. In order to open the safety valve, the auxiliary lifting device is acted upon, through a separate supply system, with an auxiliary medium which may be nitrogen. The auxiliary medium lifts the lifting bell and thus reinforces the opening of the spring-loaded safety valve. Once the auxiliary lifting device is relieved of the auxiliary medium, the spring force of the safety valve acting in the closing direction immediately predominates, so that the valve closes rapidly. In that rapid motion, however, it is not possible to detect the closing pressure.

Testing of a safety valve below the closing pressure is also believed by professionals in the field to offer no likelihood of success, because in a safety valve that is used, for instance, as a control valve, complex flow conditions prevail due to its construction. Heretofore, ascertaining the closing pressure of a control valve has therefore not been done as a rule.

SUMMARY OF THE INVENTION

It is accordingly an object of the invention to provide a method and an apparatus for testing a spring-loaded safety valve, which overcome the hereinafore-mentioned disadvantages of the heretofore-known methods and devices of this general type and which enable the closing pressure of the safety valve to be ascertained without allowing a severe thermal strain on components. Cooling of the medium, for instance by spraying structural parts in components with water, should not be necessary.

With the foregoing and other objects in view there is provided, in accordance with the invention, a method for testing a spring-loaded safety valve, which comprises ascertaining a closing pressure of a spring-loaded safety valve by selecting a pressure of a medium acting on a closing device of the safety valve to be less than an expected closing pressure; lifting the closing device with a force originating at an auxiliary lifting device by acting upon a chamber below a lifting bell in the auxiliary lifting device with an auxiliary medium; then closing the safety valve by diverting the auxiliary medium out of the chamber of the auxiliary lifting device being acted upon by the auxiliary medium and simultaneously passing a supply of auxiliary medium through the chamber and diverting the supply of auxiliary medium; measuring pressures of the medium and of the auxiliary medium as the safety valve is closing; and determining the closing pressure from the measured pressures, from an effective area ratio of the lifting bell and a valve plate of the closing device, and from a constant, in accordance with the equation:

$$P_S = P_P + \frac{P_H \cdot V_A}{m+1}$$

wherein $P_S$ is the closing pressure of the safety valve, $P_P$ is the measured pressure of the medium acting upon the closing device in the closing process, $P_H$ is the measured pressure of the auxiliary medium acting upon the lifting bell in the closing process, $V_A$ is the ratio of the effective area of the lifting bell and the closing device, and m is a constant.

With the method of the invention, it is advantageously assured that once the safety valve has been opened, it also closes slowly again. This is because the supply of auxiliary medium is passed through the chamber located below the lifting bell, that is acted upon by the auxiliary medium. In this way, the lifting bell is relieved slowly, and consequently the lifting bell as well as the safety valve closing device communicating with it close slowly, until they then close automatically beyond a remaining stroke. This slow progress makes it possible to accurately determine the closing pressure, which is namely the pressure at which the safety valve closes, with suitable measurement pickups. Through the use of the method of the invention, possible damage to the safety valve when it closes quickly is advantageously avoided. Moreover, cooling down of any components in order to reduce the pressure need not be undertaken in order to attain the closing pressure. Accordingly, one makes do without a thermal strain.

In accordance with another mode of the invention, there is provided a method in which, in order to determine the aforementioned constant m, the closing pressure $P_S$ is measured, for instance in a plurality of known safety valves, by another known method. Moreover, the pressures of the medium $P_P$ and of the auxiliary medium $P_H$ are measured in the closing process. From these values, a correction term K can be ascertained in accordance with the equation:

$$P_S = P_P + P_H \cdot V_A + K \tag{1}$$

Based on the awareness that the correction term K is proportional to the closing pressure $P_S$, the constant m is obtained experimentally as a slope of a function $-K=f(P_S)$ which is obtained from a plurality of value pairs $(-K, P_S)$.

With the objects of the invention in view, there is also provided an apparatus for testing a spring-loaded safety valve including a closing device having a valve plate with an effective area being acted upon by a medium, and the medium having a pressure being less than an expected closing pressure acting upon the valve plate, the apparatus comprising an auxiliary lifting device to be connected to the safety valve and acting in an opening direction of the safety valve for opening the safety valve; the auxiliary lifting device including a housing, a lifting bell to be connected to the closing device of the safety valve and to be displaced in the housing, the lifting bell having an effective area and having a side facing toward the safety valve and defining a chamber in the auxiliary lifting device on the side of the lifting bell; incoming and outgoing lines being connected to the chamber for carrying an auxiliary medium; a supply container for the auxiliary medium being disposed in the incoming line and being filled when the safety valve is open; a valve being disposed in the outgoing line for directing a flow of contents of the supply container through the chamber of the auxiliary lifting device upon opening of the valve; pressure pickups disposed in the medium and in the auxiliary medium; and an evaluation unit being connected to the pressure pickups and receiving a constant and a ratio of the effective areas.

The effective area is the largest cross-sectional area of the lifting bell and the valve plate, respectively, being disposed at right angles to the respective direction of motion. They are acted upon by the medium and the auxiliary medium, respectively.

The advantage attained with the apparatus of the invention is that the closing pressure can be determined without having to thermally strain system parts for cooling purposes, for instance by spraying them with water.

In accordance with a concomitant feature of the invention, in order to determine the constant m, pressure pickups are disposed in the medium and in the auxiliary medium, for instance in safety valves having closing pressures that are known. These two pressure pickups are connected to the evaluation unit. There the constant is determined and is made available as a value for determining the closing pressure. Two evaluation units may also be present, for determining the constant and for determining the closing pressure with the aid of the constant.

With the method and the apparatus of the invention, rapid, reliable testing of a safety valve is advantageously possible, in a way that treats components gently and in which the closing pressure of the safety valve is also determined and monitored.

Other features which are considered as characteristic for the invention are set forth in the appended claims.

Although the invention is illustrated and described herein as embodied in a method and an apparatus for testing a spring-loaded safety valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
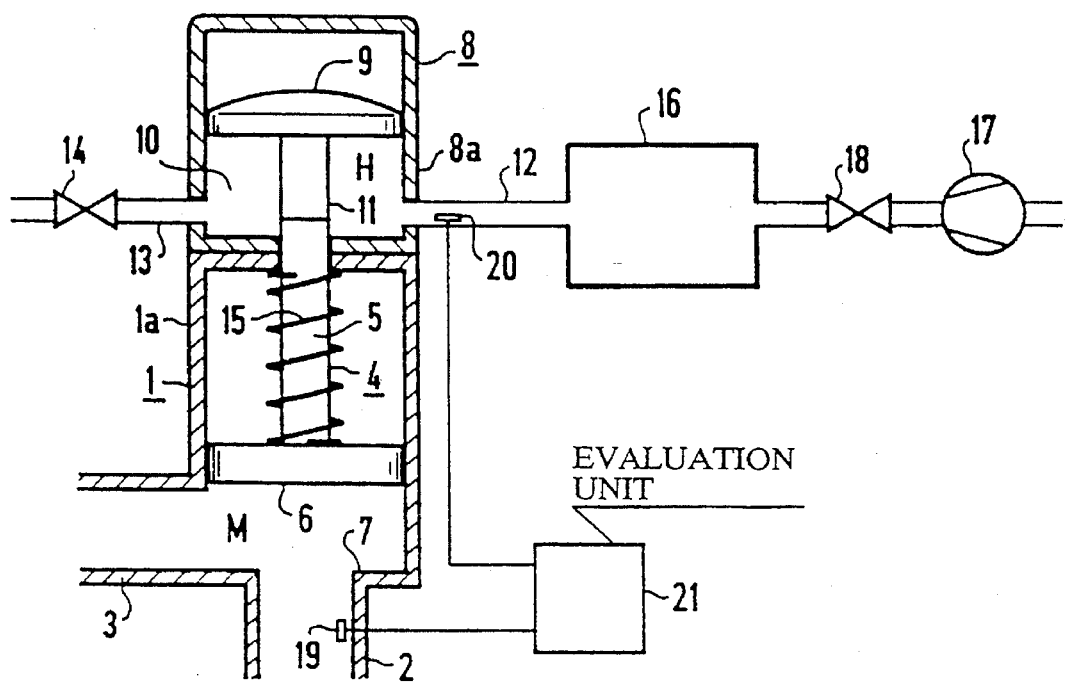
FIG. 1 is a fragmentary, diagrammatic, cross-sectional view and a schematic and block circuit diagram of a layout of an apparatus for testing a safety valve according to the invention.

Referring now to the figures of the drawing in detail and first, particularly, to FIG. 1 thereof, there is seen a safety valve 1 having a housing 1a as well as an incoming line 2 and an outgoing line 3 for a medium M. A closing device 4 is disposed in the safety valve 1. This closing device 4 includes a spindle 5, to which a closing spring 15 is assigned, and a valve plate 6, which may cooperate with a valve seat 7. In order to test the safety valve 1, the closing device 4 is acted upon by the medium M through the incoming line 2. A pressure $P_P$ of the medium M during the test (pressure of medium) is less than an expected closing pressure $P_S$ of the safety valve 1.

In a safety valve 1, a distinction is made between a response pressure of the medium M, at which the closing device 4 is lifted, and the closing pressure $P_S$, at which the closing device 4 closes again. This closing pressure $P_S$ is always lower than the response pressure at which the closing device 4 opens. In order to avoid strains on components, in a method according to the invention the closing pressure $P_S$ is ascertained at a medium pressure $P_P$ that is lower than the expected closing pressure $P_S$.

In order for the safety valve 1 to then be openable at all, it is connected to an auxiliary lifting device 8. This device includes a lifting bell 9 in a housing 8a. The lifting bell 9 is connected to the spindle 5 of the closing device 4 by means of a bell spindle 11 which passes through leadthroughs in the housings 1a and 8a. A chamber 10 below the lifting bell 9 in the auxiliary lifting device 8 is connected to an incoming line 12 and an outgoing line 13 for an auxiliary medium H. This auxiliary medium H may be nitrogen gas. In order to lift the closing device 4 of the safety valve 1, the auxiliary medium H is passed into the chamber 10. The safety valve 1 then opens. In order to ascertain the closing pressure $P_S$ of the safety valve 1, in other words the pressure of the medium M at the moment when the safety valve 1 closes, a closing operation must be initiated. It would be obvious to reduce the medium pressure $P_P$ below the valve plate 6. However, this is possible only through cooling of the medium M, which would result in a thermal strain on components. A closing operation can also be initiated by opening the outgoing line 13 of the auxiliary lifting device 8. To that end, there is a valve 14 in the outgoing line 13. In such a rapid relief of the lifting bell 9, the force of the closing spring 15 in the safety valve 1 would very rapidly predominate, so that the valve plate 6 would very quickly strike the valve seat 7. With this kind of rapid progression, it is impossible to measure the pressure $P_P$ in the medium M at the moment of closure of the safety valve 1 and therefore to determine the closing pressure $P_S$ of the safety valve 1.

According to the invention, a supply container 16 for the auxiliary medium H is located in the incoming line 12 for the auxiliary medium H, which discharges into the auxiliary lifting device 8.

In order to fill this supply container 16, a compressor 17 is provided. A 200-bar gas bottle, for instance a nitrogen bottle, with a reducing valve, may also be provided. In order to check the safety valve 1, the supply container 16 and the chamber 10 below the lifting bell 9 must be filled with the auxiliary medium H by means of the compressor 17.

In order to relieve the chamber 10, the compressor 17 is first blocked off from the supply container 16 by a valve 18. Then the valve 14 in the outgoing line 13 is opened. Due to the relatively large supply of auxiliary medium H which is located in the supply container 16 and is passed through the chamber 10, the result is a very slow dropping of the lifting bell 9 in the auxiliary lifting device 8. The closing device 4 of the safety valve 1 drops correspondingly slowly. This accordingly leaves time to make a measurement of the closing pressure $P_S$. To that end, the pressure $P_P$ of the medium M under the closing device 4 in the safety valve 1 and a pressure $P_H$ of the auxiliary medium H under the lifting bell 9 in the auxiliary lifting device 8 must be measured at the moment of this closing operation. To that end, pressure pickups 19 and 20 are disposed in the aforementioned portions of the space in the safety valve 1 and the auxiliary lifting device 8. The pressure pickups 19 and 20 are connected to an evaluation unit 21. The evaluation unit 21 is also supplied with the known area ratio of the lifting bell 9 and the valve plate 6. This involves the effective areas for the pressure applied. The evaluation unit 21 is also supplied with an experimentally ascertained constant m. The closing pressure $P_S$ of the safety valve 1 is determined in the evaluation unit 21 from the variables which are present. The closing pressure $P_S$ may be compared with a command or set point closing pressure, so that some indication as to the condition of the safety valve 1 can be provided.

The closing pressure $P_S$ is composed of the pressure $P_P$ of the medium M, the pressure $P_H$ of the auxiliary medium H, and an influencing variable that can be ascribed to the flow of the medium M through the safety valve 1.

The point of departure is Bernoulli's equation, which is known, for instance, from the Brockhaus-Enzyklopädie [Brockhaus Encyclopedia], Vol. 3, 1987. It is given there as follows:

$$p + \rho \cdot g \cdot h + \tfrac{1}{2} \rho \cdot v^2 = \text{const.}$$

In the equation, p is the static pressure of a medium, $\rho \cdot g \cdot h$ is the pressure that can be ascribed to the potential energy of a unit of volume of the medium relative to a reference level. The term $\tfrac{1}{2} \rho \cdot v^2$ stands for the pressure that can be ascribed to the flow velocity of the medium. This pressure is known as the dynamic pressure or the "velocity component".

In order to determine the closing pressure $P_S$ of the safety valve 1, it is assumed that when the safety valve 1 closes, the static pressures of the medium M and the auxiliary medium H as well as the velocity component of the medium M and influences of the potential energy are operative.

That is, the closing pressure $P_S$ is composed of these pressures. The following equation applies:

$$P_S = P_P + P_H \cdot V_A + \tfrac{1}{2} \rho \cdot v^2 + \rho \cdot g \cdot h$$

$P_S$ is the closing pressure, $P_P$ is the pressure of the medium M in the closing operation, $P_H$ is the pressure of the auxiliary medium H in the closing operation, $V_A$ is the ratio of the effective area of the lifting bell 9 and the effective area of the closing device 4 and in particular of the valve plate 6, $\rho$ is the density of the medium M, and v is the velocity of the medium M. The term $\rho \cdot g \cdot h$ can be ignored if the medium M is a gas.

The term $\tfrac{1}{2} \rho \cdot v^2 + \rho \cdot g \cdot h$, together with an additional summand, which corresponds to the unknown pressure difference between the closing pressure $P_S$ to be determined and the measured pressure $P_P$ of the medium M, is referred to as a correction term K. The following equation is obtained:

$$P_S = P_P + P_H \cdot V_A + K \quad (1)$$

This correction term K is ascertained experimentally. It was recognized that $-K$ is proportional to the closing pressure $P_S$. The following equation can therefore be established:

$$-K = m \, P_S + b \quad (2)$$

In this equation, m and b are constants.

If the medium pressure $P_P$ under the valve plate 6 is to correspond accurately to the closing pressure $P_S$, then the pressure in the chamber 10 of the auxiliary lifting device 8 must be zero. Consequently, the term K=0 should also be valid.

If it is assumed that K=0 is valid if $P_S = P_P$ is valid, then from equation [2], $b = -m \, P_P$. By insertion into equation [2], the following is then obtained: $-K = m \cdot P_S - m \cdot P_P$. By insertion into the aforementioned equation [1], the following is obtained:

$$P_S = P_P + P_H \cdot V_A - m \cdot P_S + m \cdot P_P$$

By transformation, it follows that:

$$P_S = P_P + \frac{P_H \cdot V_A}{m+1} \quad [3]$$

Figure 2:
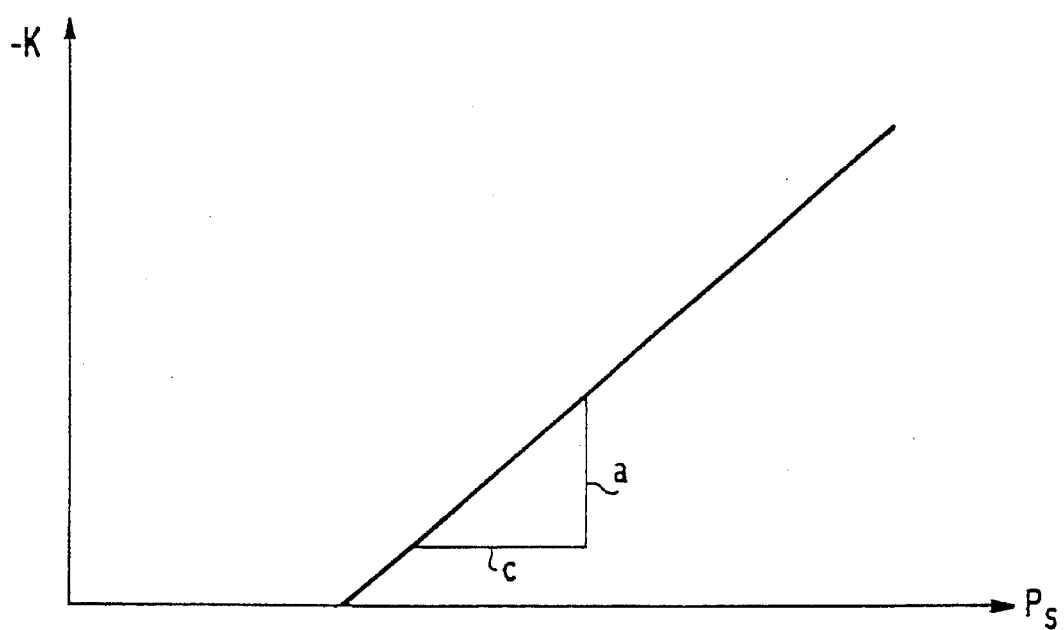
FIG. 2 is a diagram showing the dependency of a correction term $-K$ on a closing pressure $P_S$.

Thus the closing pressure $P_S$ can be ascertained both from the measured pressures $P_P$ and $P_H$ and from the known area ratio $V_A$, if the constant m is known. This constant can be ascertained from known identical safety valves in which the closing pressures $P_S$ have already been ascertained in some other way. Ascertaining of the constant m is performed experimentally, by determining the value of $-K$ from equation [1] for each closing pressure $P_S$, at known pressures $P_S$, $P_P$ and $P_H$ and at a known ratio $V_A$. If the value pairs ($-K$, $P_S$) are entered in a coordinate system as is shown in FIG. 2, then a straight line having a slope which corresponds to m is obtained as the function $-K = f(P_S)$. The slope m can be read from FIG. 2 Thus m=⅜.

With the method of the invention, the closing pressure $P_S$ of a safety valve can be determined solely by a single determination of two pressures $P_P$ and $P_H$, once the constant m has been ascertained experimentally beforehand.

We claim:

1. A method for testing a spring-loaded safety valve, which comprises:

ascertaining a closing pressure of a spring-loaded safety valve by selecting a pressure of a medium acting on a closing device of the safety valve to be less than an expected closing pressure;

lifting the closing device with a force originating at an auxiliary lifting device by acting upon a chamber below a lifting bell in the auxiliary lifting device with an auxiliary medium;

then closing the safety valve by diverting the auxiliary medium out of the chamber of the auxiliary lifting device being acted upon by the auxiliary medium and simultaneously passing a supply of auxiliary medium through the chamber and diverting the simultaneously passing supply of auxiliary medium;

measuring pressures of the medium and of the auxiliary medium, before diversion from the chamber, as the safety valve is closing; and determining the closing pressure from the measured pressures, from an effective area ratio of the lifting bell and a valve plate of the closing device, and from a constant, in accordance with the equation:

$$P_S = P_P + \frac{P_H \cdot V_A}{m+1}$$

wherein $P_S$ is the closing pressure of the safety valve, $P_P$ is the measured pressure of the medium acting upon the closing device in the closing process, $P_H$ is the measured pressure of the auxiliary medium acting upon the lifting bell in the closing process, $V_A$ is the ratio of the effective area of the lifting bell and the closing device, and m is a constant.

2. The method according to claim 1, which comprises determining the constant by measuring the closing pressure by a known method in known safety valves; measuring the pressure of the medium and the pressure of the auxiliary medium in the closing process; determining a correction term K in accordance with the equation $P_S=P_P+P_H \cdot V_A+K$; and determining the constant experimentally as a slope of a function $-K= f(P_S)$ obtained from a plurality of value pairs.

* * * * *